May 2, 1967 J. KILBURG 3,316,706
HOROLOGICAL INSTRUMENT FOR GRAPHICALLY REPRESENTING
THE RELATIVE POSITIONS OF SUN AND EARTH
Filed April 27, 1964 8 Sheets-Sheet 1

INVENTOR. JAMES KILBURG

BY
ATTORNEYS

INVENTOR. JAMES KILBURG
ATTORNEYS

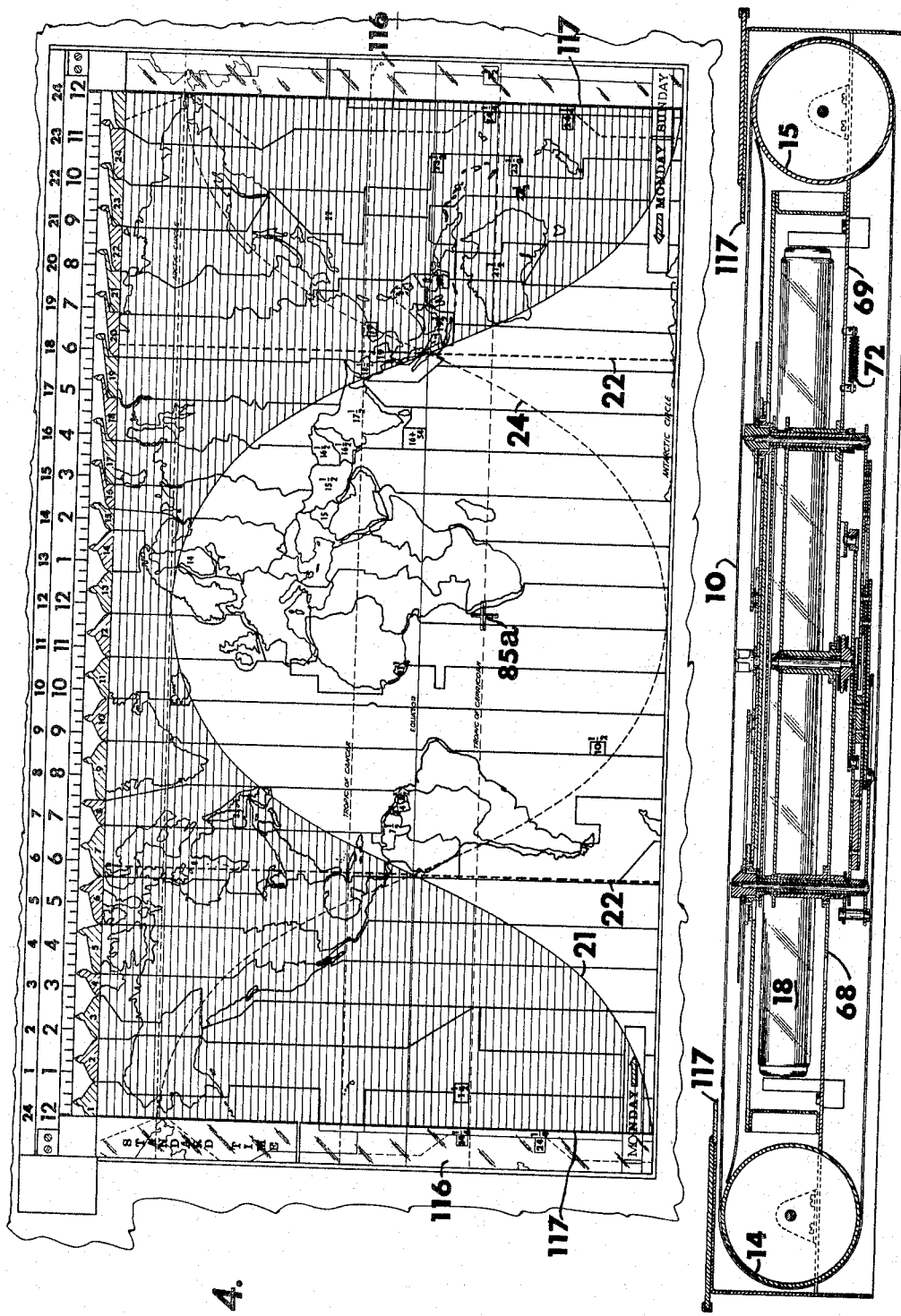

INVENTOR.
JAMES KILBURG

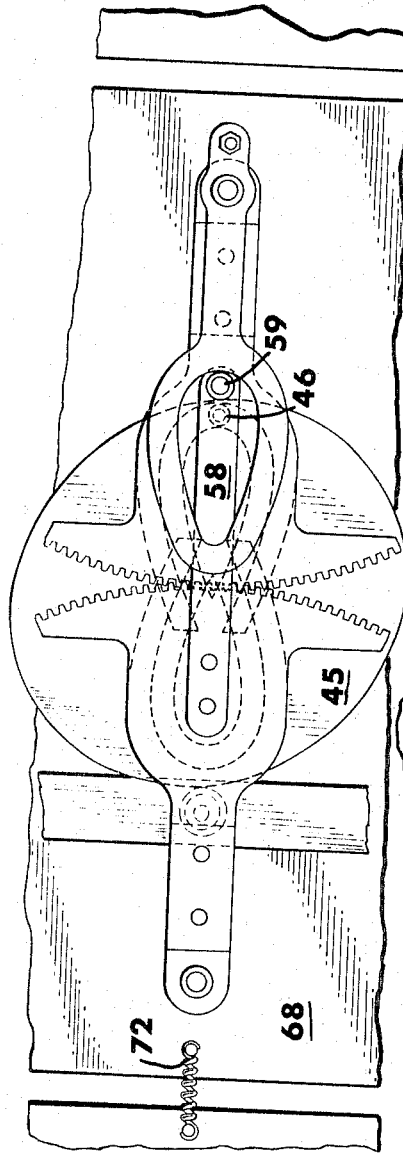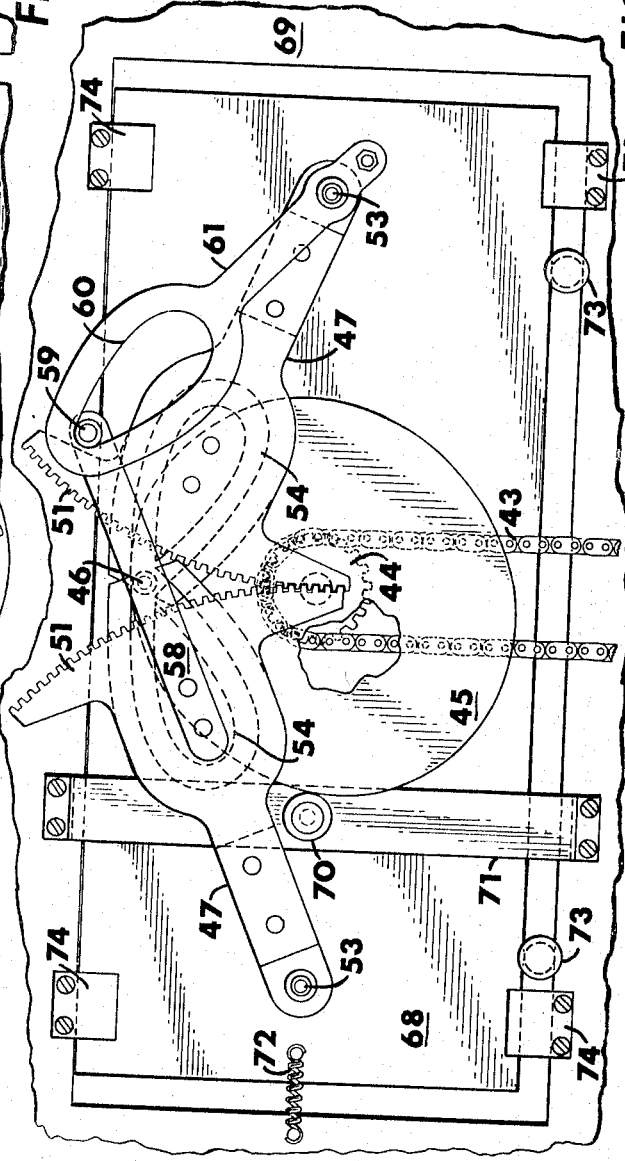

May 2, 1967  J. KILBURG  3,316,706
HOROLOGICAL INSTRUMENT FOR GRAPHICALLY REPRESENTING
THE RELATIVE POSITIONS OF SUN AND EARTH
Filed April 27, 1964  8 Sheets-Sheet 6
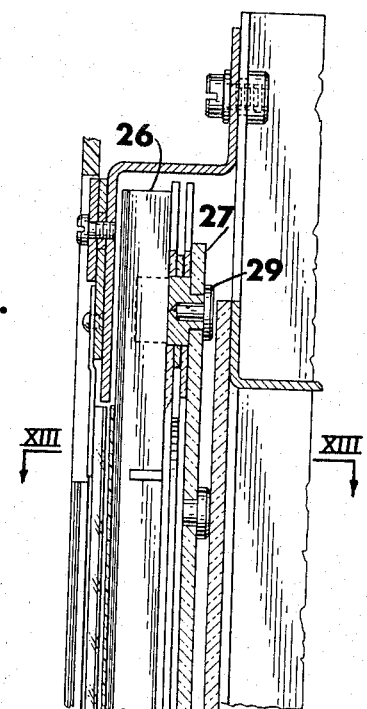
FIG. 13.
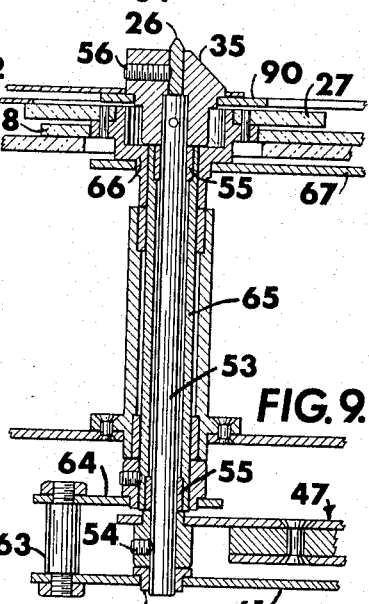
FIG. 12.
FIG. 9.
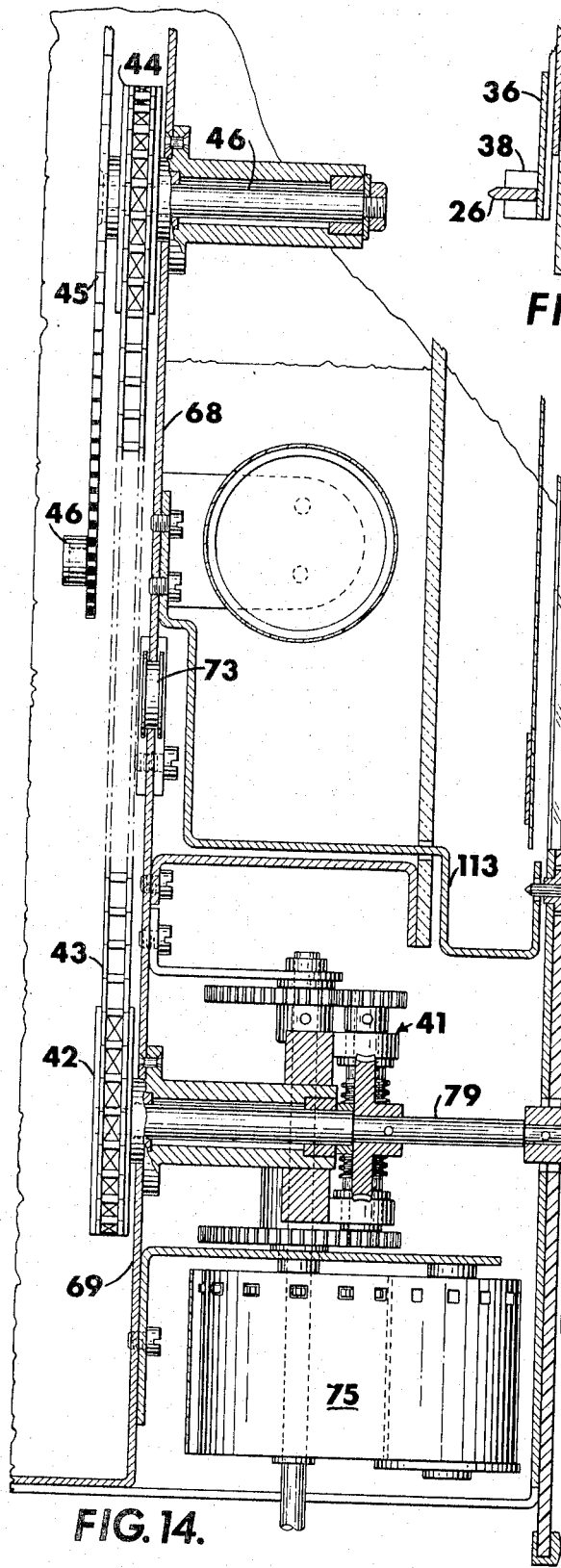
FIG. 14.
INVENTOR.
JAMES KILBURG
BY
ATTORNEYS

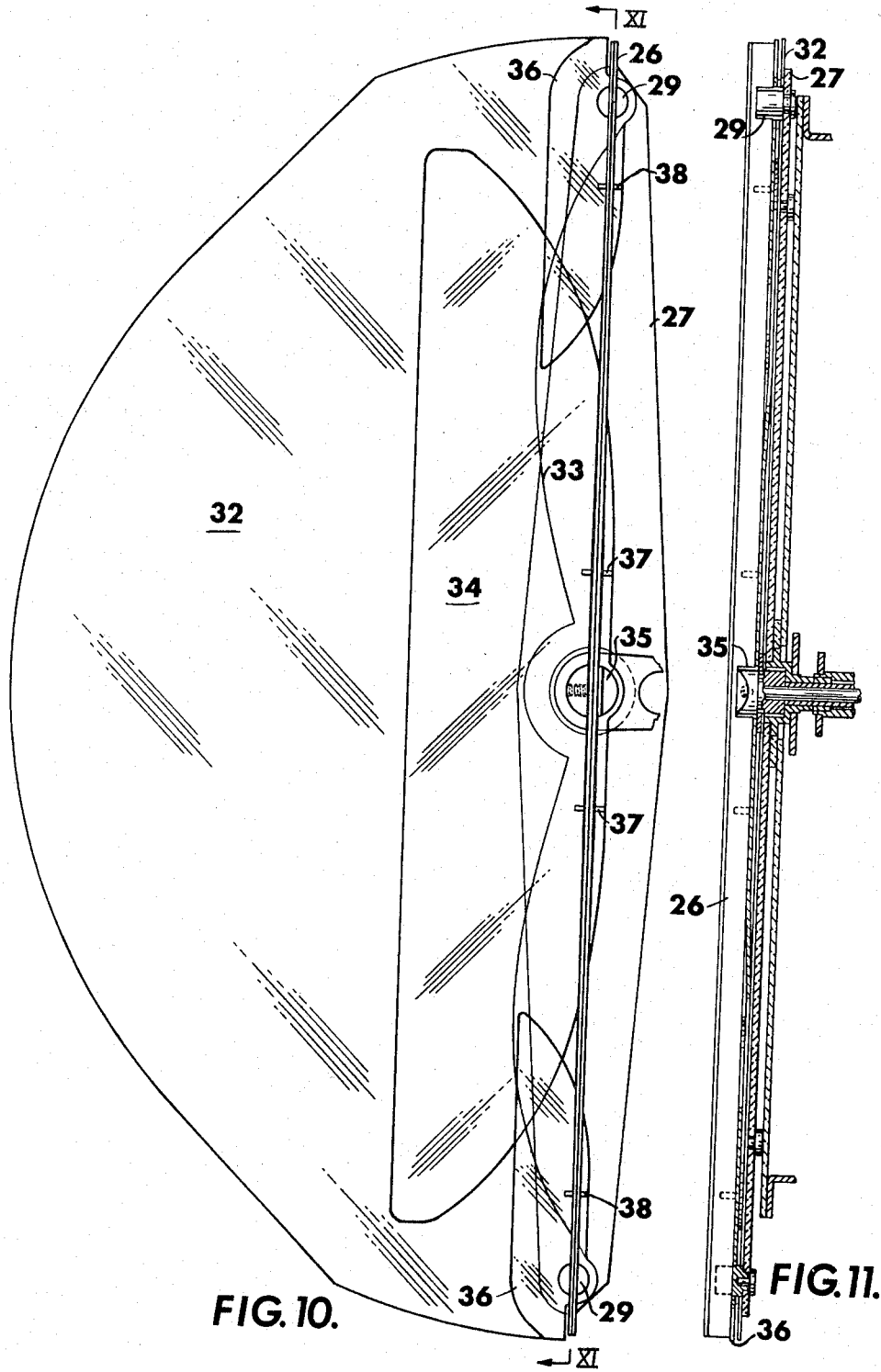

May 2, 1967
J. KILBURG
3,316,706
HOROLOGICAL INSTRUMENT FOR GRAPHICALLY REPRESENTING
THE RELATIVE POSITIONS OF SUN AND EARTH
Filed April 27, 1964
8 Sheets-Sheet 8
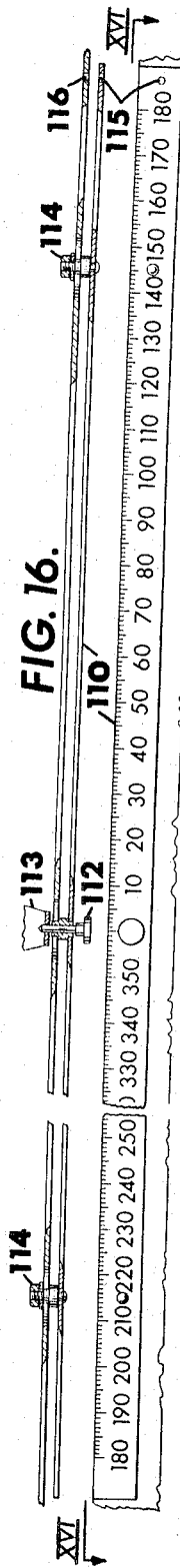
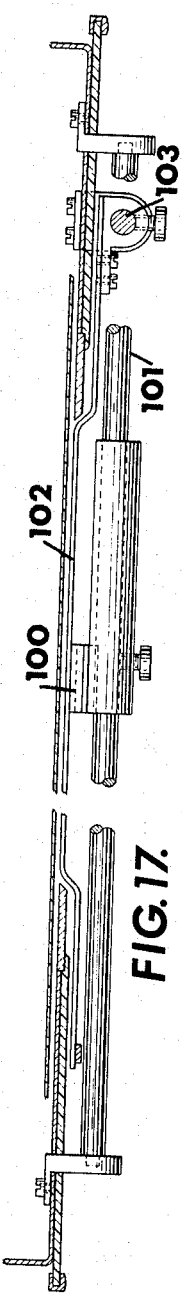
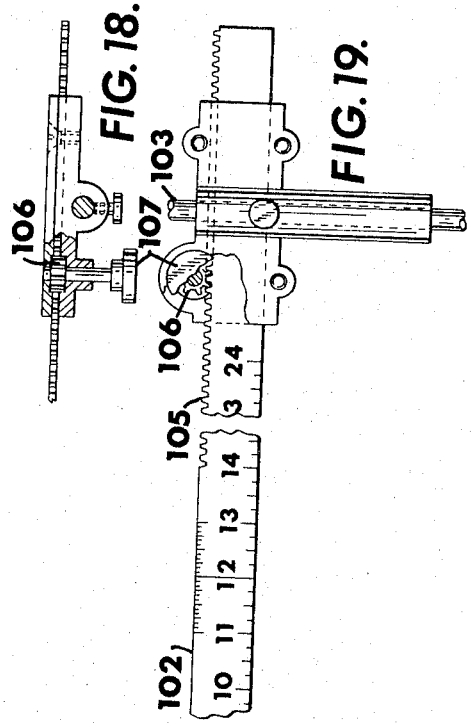
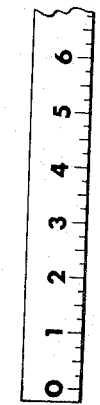
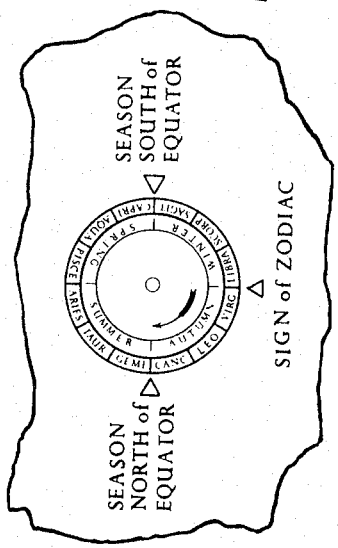
INVENTOR.
JAMES KILBURG
BY
ATTORNEYS

United States Patent Office 3,316,706
Patented May 2, 1967

3,316,706
HOROLOGICAL INSTRUMENT FOR GRAPHICALLY REPRESENTING THE RELATIVE POSITIONS OF SUN AND EARTH
James Kilburg, San Carlos, Calif., assignor to Kilburg Geochran Corporation, San Carlos, Calif., a corporation of California
Filed Apr. 27, 1964, Ser. No. 362,670
21 Claims. (Cl. 58—3)

The present invention relates to geographical, horological instruments of the kind generally described in my United States Letters Patent No. 3,226,926, issued Jan. 4, 1966, and more particularly to means for designating or delineating those areas of earth surface experiencing daylight as distinguished from those experiencing dark, including other related phenomena described hereinafter. Previous attempts to represent day and night on a map or projection of earth surface such as a Mercator projection have proven crude and inaccurate. This is true because they have failed to compensate for the constant relative motions of earth and sun, and have not taken into account the graphic distortion of earth surface as represented by cartographic projection. Also, they have failed to take into consideration the constantly changing effects of the declination of the sun produced by the tilt of the polar axis of earth relative to the plane of its orbit around the sun.

Since earth is a satellite of the sun and travels an ecliptic about the sun, the apparent speed of the sun as viewed from any point of earth surface changes at a varying rate as it moves between the perihelion and the aphelion of the ecliptic. Thus apparent time as indicated by the position of the sun is different from means or average time arranged by man into days and hours of equal length for convenience. The extent of this difference, referred to as the equation of time, is therefore essential to the correlation of apparent time and mean time for practical purposes such as navigation.

Furthermore, while day and night can be delineated on a sphere representing the earth by a simple circle circumscribing the sphere, their representation on a flat projection of earth surface becomes complex. The fact that the polar axis of the earth tilts some 23½° with respect to the plane of its orbit around the sun, results in constantly varying lengths of days and nights, as well as differing times for sunrise and sunset throughout the year. Consequently correct analogous delineation of a day on a Mercator projection entails two S-shaped curves diverging in the northern hemisphere at the summer solstice then gradually straightening to two substantially straight lines at the time of the autumnal equinox. The lines, pivoting at the equator, then assume reverse curves which progress to their greatest curvature at the winter solstice after which they again gradually approach straight line positions at the time of the vernal equinox. Also, these lines must shift in unison eastwardly and westwardly to compensate for the difference between apparent and mean time.

It is an object of the present invention to provide an instrument including a cartographic representation of earth surface and having means for delineating thereon in accurate and constantly changing form those parts of the earth experiencing daylight as distinguished from those experiencing dark.

It is another object of the invention to relate the aforementioned phenomena, in a geographically and chronologically oriented manner, to their source the sun and also to display them integrally in an easily understood form so that the related information furnished by the instrument can be expressed in conventional navigational astronomy terms and measurements as follows:

Greenwich means time in hours and fractions thereof
Greenwich apparent time in hours and fractions thereof
Local mean time in hours and fractions thereof
Local apparent time in hours and fractions thereof
Zone time in hours and fractions thereof
Sunrise in hours and fractions thereof
Sunset in hours and fractions thereof
Duration of daylight in hours and fractions thereof
Sun's meridian passage in hours and fractions thereof
Sun's equation of time in minutes and fractions thereof
Sun's Greenwich hour angle (mean and apparent) in degrees and fractions thereof
Sun's local hour angle (mean and apparent) in degrees and fractions thereof It is a further object of this invention to provide an analogue of these natural phenomena and means to indicate and express them analogously in conventional terms without the necessity of interpolation.

Another object of the invention is to relate these natural phenomena analogously, graphically and geographically to man made orientation expressions, namely mean time, yearly calendar, day of week, legal time zones, seasons, zodiac and degrees longitude and latitude.

Further and more specific objects and advantages of the invention are made apparent in the following specification wherein the invention is described in detail by reference to the accompanying drawings.

In the drawings:

FIG. 3 is a sectional view taken on the line III—III of FIG. 2;

FIG. 4 is an enlarged front elevation of the map portion only of the instrument shown in FIG. 1;

FIG. 7 is an enlarged fragmentary view taken from the plane VII—VII of FIG. 6;

FIG. 8 is a view similar to FIG. 7 illustrating some of the parts in a different position assumed during operation of the instrument;

FIG. 9 is an enlarged detail of one of the shaft assemblies illustrated in FIG. 6 shown in section;

FIG. 10 is an enlarged detail in elevation of a portion of shadow creating mechanisms illustrated in FIG. 2;

FIG. 11 is a sectional view taken on the line XI—XI of FIG. 10;

FIG. 12 is an enlarged fragmentary section of a portion of the mechanism shown in FIG. 11;

FIG. 13 is a sectional view taken on the line XIII—XIII of FIG. 12;

FIG. 14 is an enlarged fragmentary sectional view taken on the line XIV—XIV of FIG. 2 with some elements omitted for clarity;

FIG. 15 is a view in front elevation of an hour angle scale shown in FIG. 1 which forms a part of the instrument;

FIG. 16 is a view on the line XVI—XVI of FIG. 15 with parts in section;

FIG. 17 is a fragmentary detail partially in section illustrating the construction of sliding scale members shown in FIG. 1;

FIG. 18 is a plan view of a part of the mechanism shown in FIG. 19 with portions shown in section;

FIG. 19 is a view illustrating a modification of one of the scales shown in FIG. 1; and FIG. 20 is a view of an alternate form of zodiac and season display mechanism shown in FIG. 1.

Figure 1:
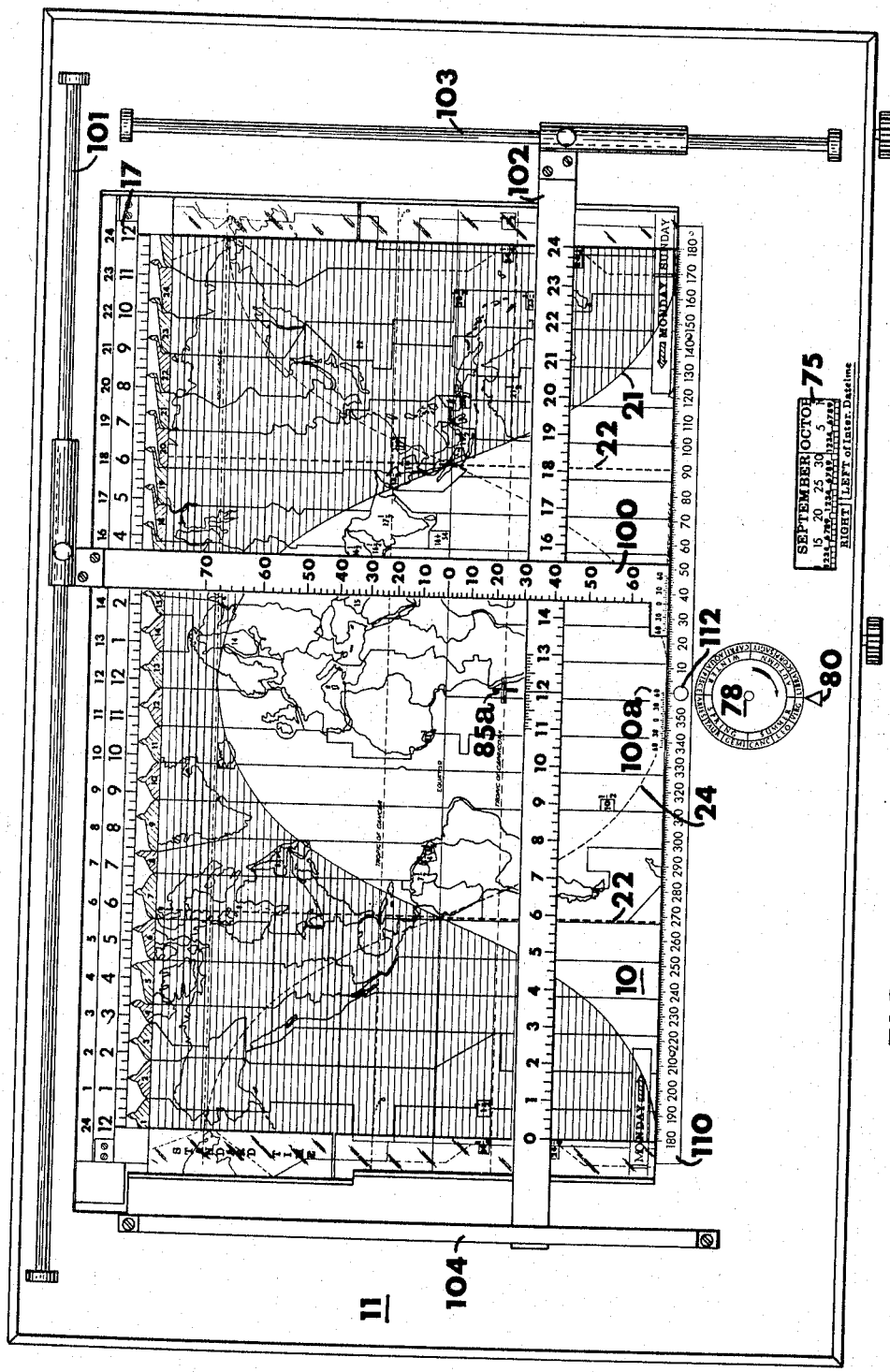
FIG. 1 is a view in front elevation of an instrument embodying the present invention.

The instrument of the present invention has the appearance, as illustrated in FIG. 1, of a map 10 contained in a housing 11 and displayed in a suitable opening or window in the front of the housing. The map is, however, as described in detail in my Patent No. 3,226,926 referred to above, actually three maps printed upon a single sheet or endless belt which as shown in FIG. 3 is trained over a pair of drums 14 and 15, one of which is driven by a motor 16 and suitable gearing, shown in FIG. 2, at a speed comparable to the passage of mean time so that the time at any point on the map is indicated by reference to a time scale illustrated at 17 in FIG. 1. A tape passing over the drums 14 and 15 bears the names of the days of the week which appear through a window 17 provided in the map belt and bridging the international date line on each of the three maps printed upon the belt.

Figure 2:
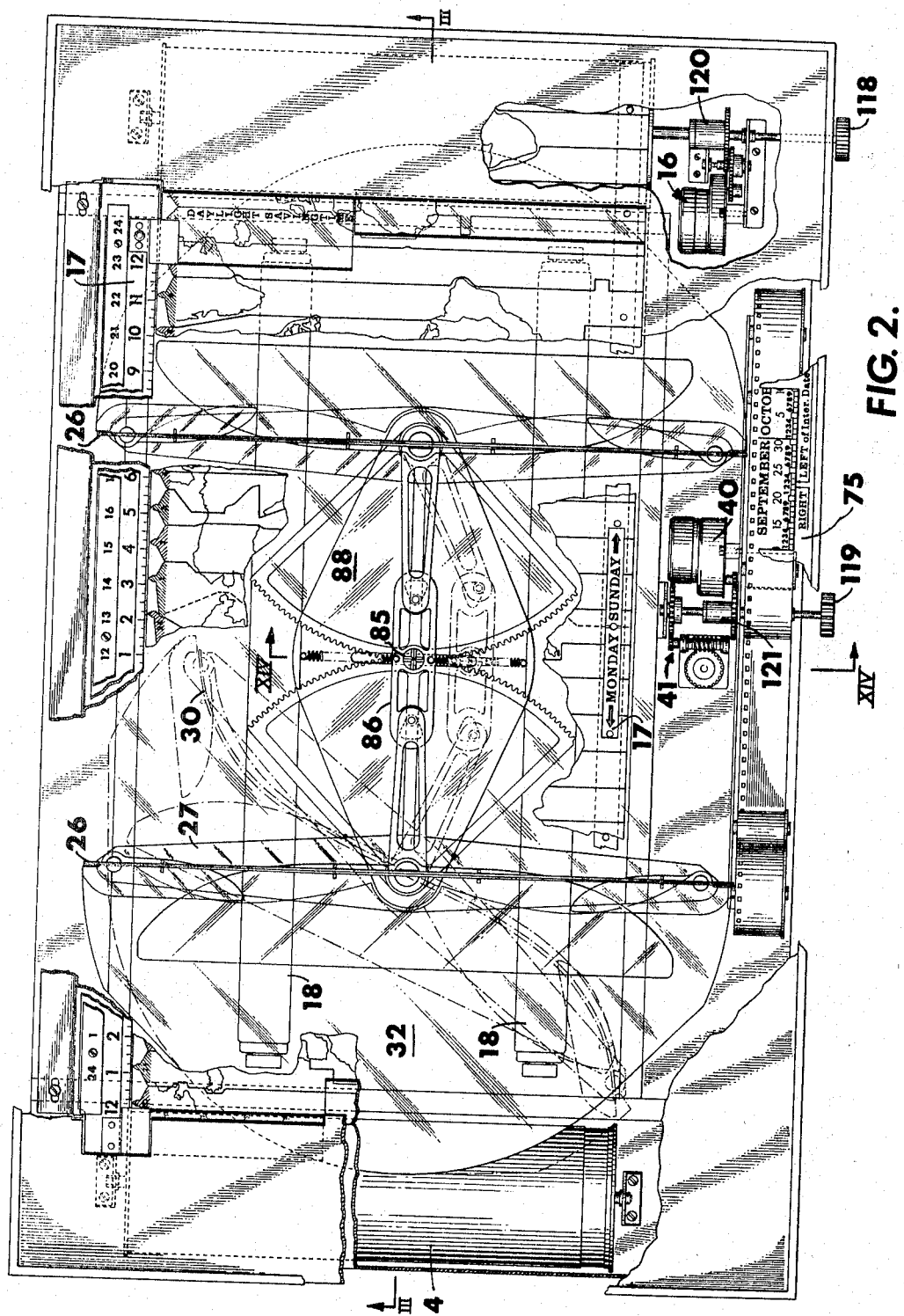
FIG. 2 is a view in front elevation of the same instrument with some parts removed and broken away to disclose various internally disposed mechanisms.

The map belt is formed by a translucent material, the maps being printed thereon preferably in various colors, and the housing contains a source of illumination such for example, as a pair of lamps shown at 18 in FIGS. 2 and 3. Thus the map is illuminated and those areas of the earth's surface experiencing daylight and dark can be represented by casting a shadow on the back surface of the map belt. However, in preference to an ordinary shadow, the present invention includes means for filtering the light for the representation of dark on the earth surface through a medium such as translucent plastic having a color which may be blue.

Since the representation of night and day on a flat map such as a Mercator projection requires lines in the form of constantly changing curves, the mechanism which depicts night and day must be in constant motion. For example as best shown in FIG. 4, a curved line 21 delineates the area experiencing daylight at the winter solstice in the northern hemisphere. This line 21 may be considered as two S-curves meeting in the northern hemisphere and these curves gradually change or straighten until they become straight lines, as indicated at 22 in dotted lines, where they depict daylight at the vernal equinox thence they continue to move or curve in the opposite direction until they assume the summer solstice position represented by the dotted line 24. After the summer solstice position, the changing curvature reverses in direction once more to pass through the straight phase represented by lines 22 at the autumnal equinox and then back to the winter solstice.

Figure 5:
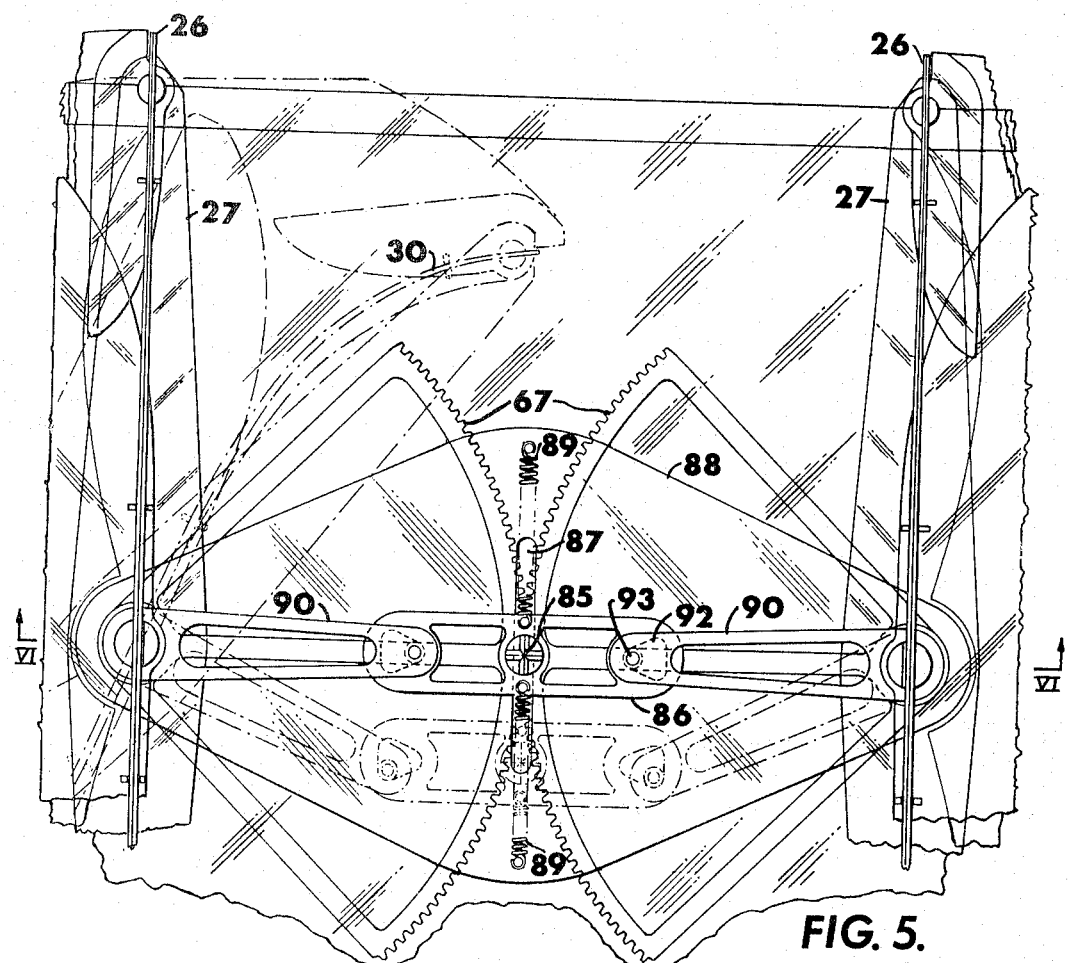
FIG. 5 is an enlarged detail of certain of the mechanisms shown in FIG. 2.

The constantly changing curvature just described is accomplished by a pair of flexible tuned reeds shown at 26 in FIGS. 2, 5, 10 and 11. Each of the reeds 26 is supported for oscillating motion about its center and is disposed directly in front of a guide bar 27. The guide bar is also centrally supported for oscillating movement and is driven at a speed that is different from the speed at which the reed is driven at its central portion. However the outer ends of the reeds have a sliding connection with the guide bar where they extend through slotted buttons 29 (see also FIG. 12). Consequently with the center of the reed driven at one speed and the center of the guide bar driven at another speed, which is slightly faster, a curvature is imparted to the reed as it moves from the equinox to the solstice position as indicated in FIGS. 2 and 5 in broken lines at 30. Since the geometry of this curve is known, the reed is tuned to cause it to simulate this curve. This may be accomplished for example by tapering the reed as shown in the drawings.

Since the space between the reeds 26 in the instrument of the present invention represents that surface of the earth experiencing daylight while the space to the opposite sides represents night, a filter is provided adjacent each reed on the night side and a preferred form of this filter is shown in FIG. 10. The filter is made of translucent plastic material in four separate pieces designed to follow the change in curvature of the reed. The four pieces of plastic are best shown in FIGS. 10 and 11 and appear in different positions in broken lines in FIGS. 2 and 5. A large plastic filter element is shown at 32 connected to opposite ends of the reed by embracing the buttons 29 and having an inner curved edge 33. A second filter element is shown at 34 as embracing and supported for pivotal movement by a central button 35 through which the reed passes. There are two small filter elements shown at 36 pivotally supported with respect to the buttons 29. Swinging movement is imparted to the element 34 upon relative movement between the reed and the guide bar 27 by means of forked members 37 extending forwardly from the face of the filter element and embracing the reed. Similar members 38 are carried by the filter elements 36 and embrace the reed adjacent its ends. These members 38 are also clearly shown in FIG. 13. Consequently upon swinging and curving movement of the reed, the several filter elements tend to follow its curvature assuming positions such for example as are shown in FIGS. 2 and 5 in broken lines. While, as may be seen in the drawing, the curvatures of the edges of the filter elements do not always coincide perfectly with the curvature of the reeds, the result is in effect perfect because the reeds are provided with a chamfered or sharpened edge which is in direct contact with the back of the map 10 as best seen in FIG. 12. Also as shown in FIG. 12, the filter elements 32, 34 and 36 are disposed in back of the reed so that with the relatively large light source provided by the lamps 18 of FIG. 2, the effect on one side of the reed viewing the front of the map, is completely light and on the other side completely filtered. Thus the line separating day from night is a clear sharp line which may be used as will hereinafter appear in measuring the length or duration of day at any particular point on the surface of the earth as well as showing the precise time of sunrise and sunset.

Figure 6:
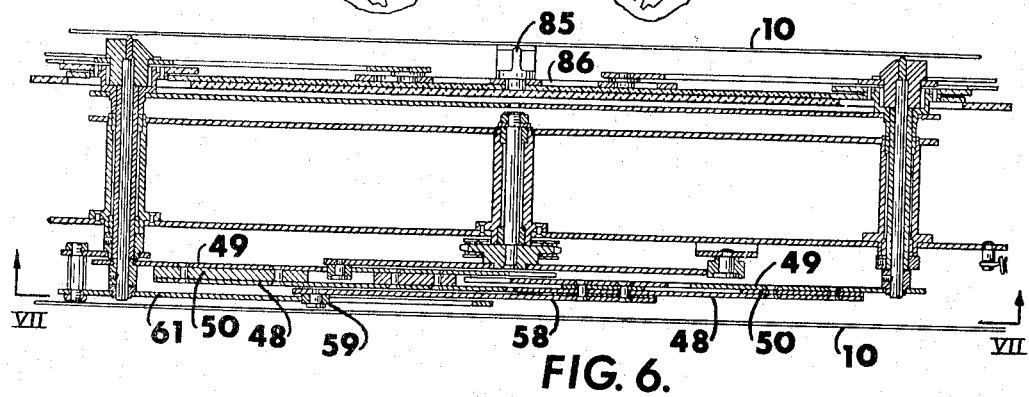
FIG. 6 is a fragmentary sectional view taken on the line VI—VI of FIG. 5.

The means for oscillating the reeds 26 and the bars 27, which impart the curvature to the reeds, comprises a synchronous motor shown at 40 in FIG. 2 which, through suitable reduction gearing generally indicated at 41 (see also FIG. 14), drives a sprocket 42. A chain 43 is trained over sprocket 42 and a sprocket 44 to rotate a shaft 46 carrying a combined crank and cam 45. Referring to FIGS. 7 and 8, the member 45 will first be discussed in connection with its function as a crank and is shown as having a crank pin 46 thereon which operates with a pair of box cam levers 47 to impart oscillating movement to the reeds 26. The construction of these box cam levers is shown in FIG. 6 where they are shown as having rear plates 48 and front plates 49 riveted together but separated by spacer members 50. The rear plates extend toward each other and terminate in meshing gear segments 51 so that the levers move in unison about their opposite pivoted ends and the front plates are those in which the cam grooves are formed, the configuration of these box cam grooves being illustrated at 54 in dotted lines. Assuming the crank disc 45 to be rotating in a clockwise direction as viewed in FIGS. 7 and 8, the crank pin 46 will pass through the box cam grooves 54 one at a time and alternately so that in following the pin, the levers 47 will oscillate from an upper position shown in FIG. 7 through the central position of FIG. 8 and then downwardly to a position which is the reverse of that shown in FIG. 7. In FIG. 9, one of the levers 47 is shown as fixed to a shaft 53 by means of a bushing and set screw shown at 54. This shaft 53 is rotatable in bushings such as shown at 55 and at its opposite end has pinned to it the slotted button 35 in which the reed 26 is secured as by a set screw 56.

The drive mechanism for the guide bars 27 which impart bending movement to the reed is also shown in FIGS. 7 and 8 wherein the left hand lever 47 is shown as having an extension 58 secured thereto (see also FIG. 6) which carries a cam roller 59 at its outer end. This cam roller acts with an internal cam surface 60 on a lever 61. The lever 61, as best shown in FIG. 9, is pivoted by means of a bushing 62 on shaft 53 and has its extreme end connected by a stud 63 and short lever 64 with a hollow shaft 65, the opposite end of which is fixed to a hub 66 which in turn supports the guide bar 27. These bars 27 are caused to move in unison through a pair of gear segments shown at 67 in FIG. 5 which are also fixed to the hubs 66.

As is most apparent from FIGS. 7 and 8 because of the greater moment arm afforded by the extension 58, as compared to the lengths of the levers 47, the guide bars will be oscillated at greater speed and through arcs of greater degree to cause bending of the reeds.

The particular configuration of the cams 54 and the internal cam 60 is dictated, as is also the tuned resiliency of the reeds, by the actual curve of the line which separates day from night on the surface of a projected map of the kind used in this instrument.

The mechanism just described produces what might be considered a picture of day which is a light area disposed centrally of the map as clearly seen in FIG. 4. This picture of day in reality however does not constantly occupy a central position with respect to the map but moves slightly in an easterly and westerly direction. This is caused by the fact that the earth moves in an ecliptic about the sun so that the apparent movement between earth and sun as viewed from earth varies in speed. Consequently the sun appears to rise at an earlier time and to set at an earlier time even at the equator where generally speaking all days may be considered to be of the same length. Consequently to accurately fix the position of day on a map as it is illustrated in FIG. 4, it is necessary that all of the above described mechanism creating the lines which delineate day and night be movable. This motion is relative to a mean time scale and is the motion which creates apparent time as distinguished from mean time necessitating the use of the equation of time for navigation and other purposes.

This equation of time motion is accomplished through mechanisms shown in FIGS. 7 and 8 wherein all of the leverage and mechanism which controls the reeds is shown as carried on a movable plate 68 disposed in an opening of a main frame plate 69. The previously described combination crank disc and cam 45 during its rotation engages a cam follower roller 70 on a bracket 71 which spans the opening in the main frame plate. A spring 72 urges the plate 68 and cam surface or edge of the cam 45 into engagement with the roller and the configuration of the cam surface imparts a reciprocal movement to the plate to compensate for the effect of the ecliptic. The plate is supported for this movement by rollers 73 and guided by plates 74. Thus the position of day with respect to the earth as it is shown in FIG. 4, relative to mean time as shown by the scale 17 is accurately depicted. Again it will be understood that the configuration of the cam 45 is dictated by natural phenomena and the speed of operation is such that the cam rotates once each year. It is of course also understood that a complete cycle of the mechanism described for creating the picture of night and day occupies one year's time. In this connection, the same synchronous motor and gearing which drives the day and night mechanism also drives a date tape, shown at 75 in FIGS. 1, 2 and 4, the function and operation of which is fully disclosed in the copending application referred to above and which serves to indicate the month and day on opposite sides of the international dateline.

All of that mechanism hereinabove described which controls the delineation of sunrise and sunset on the face of the map as well as the related date, day of the week and hour is properly considered the memory mechanism of the present instrument because this mechanism in effect stores and produces factual and graphic data in properly timed succession. Other related facts are capable of display in a very simple manner by the same memory mechanism and include the zodiac and seasons. A disc for displaying the zodiac and the seasons is shown at 78 in FIG. 1 and in FIG. 14 as carried on the same shaft 79 that drives the combination cam and crank disc 45 and which makes a single cycle once each year. Consequently, a stationary pointer such as shown at 80 in FIG. 1 designates the prevailing sign of the zodiac and season as related to all other information displayed by the instrument. The position of the pointer relative to the disc depends upon whether the instrument is being used in the northern or southern hemisphere. A modification of such a disc is shown in FIG. 20 wherein three pointers are employed, one to the left of the disc for the northern hemisphere, one to the right for the southern hemisphere, and one at the bottom for the sign of the zodiac. The right and left hand pointers are for the seasons which are opposite north and south of the equator and the lower pointer is for the signs of the zodiac which remain the same throughout the world.

Another point of information capable of graphic representation by the memory of the instrument is the precise position of the sun with respect to the earth. It should be born in mind that sun position is actually a result of earth movement. However the sun is considered in navigation and other fields as a reference point moving with respect to earth and will be so considered in the following discussion. The sun appears to be at its zenith at any given point on earth at a slightly different time each day and this position represents noon apparent time or navigationally speaking, the meridian passage. To depict the precise position of the sun with respect to the earth, a small marker shown at 85 in FIG. 2 and in enlargement in FIGS. 5 and 6 is disposed directly behind and in contact with the map 10 creating on the face of the map crossed lines as shown at 85a in FIGS. 1 and 4. These appear as hair lines but are exaggerated on the drawings. This button is carried by and extends through a frame 86 and into a vertical slot 87 in a translucent supporting plate 88 which is supported by the same structure that provides a hub assembly for the reed 26. This relationship can be seen in FIG. 9 wherein the supporting plate 88 is shown as embracing a flange of the hub member 63 with respect to which it fits loosely. The frame 86 is urged toward the center position shown in FIG. 5 by springs 89 under tension and is caused to oscillate in a vertical direction to which it is confined by the slot 87 by levers 90 fixed to and oscillating with the same mechanism which actuates the reeds 26. This connection also may be viewed in FIG. 9 wherein levers 90 are shown as press fitted to the button 35 which carries the reed 26. Consequently, the sun button 85 is caused to move through a full cycle from winter solstice to summer solstice and back to winter solstice in a one year period. Since this motion is not constant in speed but is in the nature of a simple harmonic motion, the driving connection between the lever 90 and the frame 86 is in the form of two inside cams shown at 92 in the carriage 86 each engaged by a pin 93 on one of the levers. The cam surfaces are generated mathematically to reproduce the actual motion of the sun in a north and south direction with respect to earth surface thus representing the declination of the sun. As previously explained, the position of sun relative to earth changes because of the ecliptic of earth travel and this variation in position is in an easterly and westerly direction with respect to earth which has already been taken into consideration by supporting this portion of the memory mechanism on the sliding plate 68 (FIGS. 7 and 8) which is actuated by the cam 45.

A great deal of information useful for many purposes is readily obtainable from the present instrument by the use of suitably arranged scales. For example the declination of the sun in terms of degrees, the equation of time, the sun's meridian passage, the sun's hour angle either apparent or mean, the length of a day between sunrise and sunset at any place, as well as the time of sunrise and sunset at any latitude and at any particular date. Scales suitable for this purpose are illustrated in FIG. 1 wherein a latitude scale 100 is illustrated as slidably supported by a rod 101. By moving this scale into position adjacent the sun position indicating mark 85a, the declination of the sun is readily apparent as measured in degrees and the remainder of the scale is useful for locating various positions on the map in terms of degrees latitude. The equation of time and the sun meridian passage are read from an hour scale 102 slidably supported on a bar 103 and retained at its other end by a guide 104. Comparison between the position of the sun mark 85a and the mean hour 12 provides a reading of the equation of time and the sun meridian passage. The length of day at any latitude is obtained by sliding the scale 102 to the latitude in question and reading the number of hours and minutes between the lines of demarkation for sunrise and sunset. To facilitate a direct reading of the length of day, a modified support for the sliding scale such as shown in FIGS. 18 and 19 may be employed. As shown in these figures, a rack 105 is provided on the scale and engaged by a pinion 106 controlled by a finger wheel 107 for moving the scale horizontally in front of the map. Thus by moving the scale until zero registers with the sunrise line, a direct reading of the length of day will be apparent at the line of demarkation of sunset. By this means, the necessity for interpolation has been avoided and the instrument, as with other data, gives a direct reading.

The hour angle of the sun either apparent or mean and either at Greenwich or at any given location on the map may be read from an hour angle scale 110 disposed adjacent the bottom of the map. As is apparent, the hour angle for any given point on the map is obtainable by sliding the scale 100, now used as a straightedge, to a point where it intersects the location in question and reading the angles indicated by the member 100 on the hour angle scale. Since Greenwich hour angle is important in navigation, it can be determined without using the member 10 by reading from a vernier scale printed on the map as shown at 100a at Greenwich or zero longitude. The hour angle so given is the mean hour angle if the scale 110 is fixed with respect to the frame as is the time scale 17 at the top of the map. However the apparent hour angle can also be read by fixing the hour angle scale for movement with the sun image on the face of the map. This is accomplished as best shown in FIGS. 14, 15 and 16. In FIG. 14, the hour angle scale 110 is shown as connected by a pin 112 to a bracket 113 secured to and movable with the supporting plate 68 which also supports the sun marker 85 of FIGS. 5 and 6. The hour angle scale 110 is mounted for sliding movement in the front of the housing by pin and slot mechanisms shown at 114 in FIG. 16 wherein pin 112 is also shown. This pin is removable and insertable through holes 115 and 116 in the scale and housing respectively when it is desired to fix the scale against movement with the sun for the reading of a mean hour angle.

The relationship of the two movable scales 100 and 102 to each other as viewed in plan is illustrated in FIG. 17. In my patent referred to above, the opening in the housing through which the map is exposed is of the same length or of substantially the same length as one entire map of the world as viewed on the belt which carries the maps. The present invention includes an improvement on such an arrangement in that the opening is somewhat larger in the opaque portion of the housing but a transparent marginal element 116 as shown in FIG. 4 is disposed at each side of the opening and preferably provided with a darkened edge 117. The space between the edges 117 represents the entire world and the transparent elements enable one to read names or legends on the map which otherwise would be only partially exposed. In this connection, the standard time and daylight time panels, the construction and function of which is fully disclosed in the said copending application, are also formed of transparent material.

While the instrument as herein disclosed is useful for telling the date, day and time of day, it is also useful for indicating any of the many conditions or phenomena described above as they occur, not only on the present date, but on any day of the year. This is made possible by interconnection of the drive assembly 16 and the drive assembly including the motor 40. As indicated in the present drawings, these drive assemblies are independently and manually adjustable through knurled wheels 118 and 119 (FIG. 2) which may be used to adjust the position of the control elements independently of the motor by reason of the inclusion of overrunning clutches 120 and 121, respectively, in these drive assemblies. However by interconnecting the two drive systems with suitable chain or gear drives, not shown, a single adjustment can be made to move the instrument to indicate prevailing conditions upon any future or past date.

I claim:
1. An instrument of the kind described comprising a rectilinearly movable cartographic representation of earth surface, means moving constantly and continuously to delineate and visibly distinguish thereon the areas thereof experiencing day and night, and means to cause rectilinear movement of said cartographic representation relative to said delineating means to visibly represent the changing position of day resulting from earth rotation.

2. The instrument of claim 1 including means to produce relative movement between said representation and said delineating means to represent the changing position of day resulting from declination of the sun.

3. The instrument of claim 1 including means to produce relative movement between said representation and said delineating means to produce the effect on day at apparent time which results from earth's ecliptic.

4. An instrument of the kind described comprising in combination with a rectilinearly movable cartographic representation of earth surface, means to produce a visible delineation thereon of the area thereof experiencing daylight, and means effecting constant adjustment of the delineating means to effect an analog representation of day on earth.

5. The instrument of claim 4 in which the representation of earth surface is a translucent film and in which the delineating means is disposed behind the film.

6. The instrument of claim 5 with a source of illumination behind the film and shadow producing means associated with the delineating means to visibly distinguish day and night.

7. The instrument of claim 5 in which the representation of earth surface is a flat projection repeatedly produced in the form of an endless belt, means framing a portion of said belt to expose at least 360° of earth surface at one time, means for moving the belt past the framing means at the rate of 360° of earth surface in twenty-four hours, and means to produce said visible delineation generally centrally of said framing means.

8. The instrument of claim 5 in which the representation of earth surface is a flat projection repeatedly produced in the form of an endless belt, means framing a portion of said belt to expose more than 360° longitudinal earth surface, and means to delineate exactly 360° thereof.

9. The combination with a flat nonpolar cartographic projection of earth surface of means to produce demarkation thereon of sunrise and sunset comprising flexible reeds, and means to impart bending movement to said reeds in opposite directions from a generally central position to impart changing curvature thereto corresponding to seasonal changes in time of sunrise and sunset.

10. The combination of claim 9 in which the reeds are disposed adjacent and slidably connected to rigid guide bars, means to impart constant oscillating movement to the reeds at a determined speed, and means to impart such motion to the guide bars at a different speed to cause bending of the reeds.

11. The combination of claim 10 in which the reeds are tuned to obtain the required curvature.

12. The combination of claim 9 with means for displaying the day of the week prevailing for all conditions of sunrise and sunset depicted.

13. The combination of claim 9 with means for displaying the day of the month and means for driving said display means to constantly display the day corresponding to the depicted conditions of sunrise and sunset.

14. The combination of claim 9 with means for displaying the apparent sun hour angle of any point on the projected surface of earth.

15. The combination of claim 9 with constantly driven means indicating the season of the year prevailing during all sunrise and sunset conditions depicted.

16. The combination of claim 15 in which the seasons prevailing north and south of the equator are both indicated.

17. The combination of claim 9 with constantly driven means indicating the sign of the zodiac corresponding to all sunrise and sunset conditions depicted.

18. The combination of claim 9 with a rectilinear time scale extending easterly and westerly of the projected earth surface, and means supporting said scale for adjustment in a northerly and southerly direction.

19. The combination with a flat linearly movable cartographic representation of earth surface of means to indicate a position thereon representing the sun where it is directly overhead, and means imparting continuous movement to said indicating means to represent the position of the sun with respect to said representation of earth surface throughout the year.

20. The combination of claim 19 with a scale associated with said projection for indicating the declination of the sun in degrees.

21. The combination of claim 19 with a scale associated with said projection for indicating mean time of the meridian passage of the sun and the equation of time.

References Cited by the Examiner

UNITED STATES PATENTS

| | | |
|---|---|---|
| 536,504 | 3/1895 | Arriaga. |
| 1,484,174 | 2/1924 | Divo. |
| 2,001,633 | 5/1935 | Segovia _____ 58—42.5 |
| 2,202,438 | 5/1940 | Tidler _____ 58—42.5 X |
| 2,299,913 | 10/1942 | Clough _____ 58—42.5 |

FOREIGN PATENTS 3,179    1912    Great Britain.

RICHARD B. WILKINSON, Examiner.

GERALD F. BAKER, MICHEAL L. LORCH,
*Assistant Examiners.*